United States Patent

Ohishi et al.

[11] Patent Number: 5,826,438
[45] Date of Patent: Oct. 27, 1998

[54] EXPANSION VALVE INTEGRATED WITH ELECTROMAGNETIC VALVE AND REFRIGERATION CYCLE EMPLOYING THE SAME

[75] Inventors: Shigeji Ohishi, Anjo; Yoshio Miyata, Nagoya, both of Japan

[73] Assignee: Denso Corporation, Kariya, Japan

[21] Appl. No.: 884,758

[22] Filed: Jun. 30, 1997

[30] Foreign Application Priority Data

Jul. 1, 1996 [JP] Japan ..................................... 8-171517
Apr. 22, 1997 [JP] Japan ..................................... 9-104583

[51] Int. Cl.$^6$ ..................................................... F25B 5/00
[52] U.S. Cl. ............................. 62/199; 62/222; 236/92 B
[58] Field of Search ............................ 236/92 B; 62/199, 62/222, 225

[56] References Cited

U.S. PATENT DOCUMENTS 2,936,790  5/1960  Dahl et al. ............................ 236/92 B
5,156,016  10/1992  Day .......................................... 62/199
5,385,035  1/1995  Nishida et al. .
5,588,590  12/1996  Sakakibara et al. .
5,675,982  10/1997  Kirol et al. ............................ 236/92 B

*Primary Examiner*—Harold Joyce
*Assistant Examiner*—Susanne C. Tinker
*Attorney, Agent, or Firm*—Harness, Dickey & Pierce, PLC

[57] ABSTRACT

According to the present invention, in an expansion valve integrated with a electromagnetic valve, there are provided an inlet refrigerant path, a restriction path for decompressing and expanding the refrigerant from the inlet refrigerant path, a valve element for adjusting an opening degree of the restriction path, a diaphragm operating unit, and an outlet refrigerant path for supplying the refrigerant decompressed and expanded in the restriction path to an evaporator. The outlet refrigerant path is opened or closed by the electromagnetic valve 200. When the electromagnetic valve 20 is closed, the diaphragm operating unit operates to close the valve element in the restriction path, based on the refrigerant pressure between the valve element of the electromagnetic and the restriction path. In this way, it is possible to reduce the noise of the refrigerant when the electromagnetic valve is closed.

8 Claims, 6 Drawing Sheets

EXPANSION VALVE INTEGRATED WITH ELECTROMAGNETIC VALVE AND REFRIGERATION CYCLE EMPLOYING THE SAME

CROSS REFERENCE TO THE RELATED APPLICATIONS

This application is based on and claims priority of Japanese Patent Application Nos. Hei. 8 - 171517 filed on Jul. 1, 1996, and Hei. 9 - 104583 filed on Apr. 22, 1997.

BACKGROUND OF THE INVENTION

1. Field of the Invention

The present invention relates to an expansion valve integrated with an electromagnetic valve, in which the electromagnetic valve is disposed at a downstream side of the expansion valve and both are integrated. The present invention is suitably employed in, for example, an air conditioning apparatus for a vehicle, which has an air conditioning unit incorporating therein evaporators of a refrigeration cycle, disposed at a front side and a rear side, respectively, in a passenger compartment.

2. Description of Related Art

Conventionally, for independently performing an air conditioning control at a front side and an air conditioning control at a rear side in a passenger compartment, there has been known a refrigeration cycle for air conditioning a vehicle, in which cooling evaporators are disposed in the front air conditioning unit and rear air conditioning unit, respectively, in the passenger compartment, and each of these two cooling evaporators and expansion valves for decompressing refrigerant flowing into these evaporators are disposed in parallel.

In this refrigeration cycle, the electromagnetic valve is connected to the expansion valve in series to switch a flow of the refrigerant into these evaporators. However, by rapid opening and closing operations of the electromagnetic valve, there occurs a problem in that water hammer noise is generated.

As disclosed in JP-A-7-151422, it has been proposed that the electromagnetic valve is integrated with the expansion valve body so that both of the electromagnetic valve and the expansion valve can be downsized. Further, the electromagnetic valve is disposed at a downstream side of the expansion valve, i.e., in a path at a low-pressure side through which gas and liquid two phase refrigerant flows, to reduce the water hammer noise generated when the electromagnetic valve is closed.

However, resulting from various studies and examinations of the above-described expansion valve integrated with the electromagnetic valve by the inventors, it turns out that the noise cannot be reduced based on the following reasons.

That is, when a flow of the refrigerant into one of the two evaporators connected in parallel in the refrigeration cycle is stopped, a temperature of the evaporator increases up to an ambient temperature (a temperature of the passenger compartment). Therefore, a temperature of a temperature sensing bulb disposed at a refrigerant outlet side of the evaporator also increases up to the temperature of the passenger compartment. In contrast, a pressure at a low-pressure side of this expansion valve lowers by the refrigerant circulating into the other expansion valve (by an operation of the compressor), with the result that a force in a valve closing direction is applied to a valve body of the expansion valve to fully close the expansion valve.

Accordingly, it turns out that, when the electromagnetic valve is opened while the expansion valve is fully opened, a large amount of the refrigerant, which has been stopped, starts to flow into the evaporator suddenly, with the result that refrigerant flowing noise is generated and noise due to sudden pressure drop at a downstream side of the expansion valve is generated.

SUMMARY OF THE INVENTION

In view of the above-described problems, it is an object of the present invention to reduce refrigerant noise generated when the electromagnetic valve is closed in the expansion valve integrated with the electromagnetic valve.

According to an aspect of the present invention, an expansion valve is integrated with an electromagnetic valve, which is employed in a refrigeration cycle having evaporators connected in parallel. The expansion valve decompresses and expands refrigerant, and the electromagnetic valve opens and closes a refrigeration path of the refrigeration cycle. The expansion valve includes an expansion valve body for forming an outer shape of the expansion valve, and the expansion body has an inlet refrigerant path for introducing high-pressure side refrigerant of the refrigeration cycle, a restriction path for decompressing and expanding the refrigerant introduced from the inlet refrigerant path and an outlet refrigerant path for supplying the refrigerant decompressed and expanded in the restriction path. Further, the expansion valve includes a first valve element for adjusting an opening degree of the restriction path, and a valve element operating mechanism for moving the first valve element. The electromagnetic valve is integrally assembled in the expansion valve body and includes a second valve element disposed to open and close the outlet refrigerant path. When the second valve element is closed, the valve element operating mechanism operates based on a refrigerant pressure between the second valve element and the restriction path such that the first valve element is closed.

In this way, while the electromagnetic valve is closed, the upstream side of the second valve element becomes the high-pressure side pressure by an operation of the refrigerant cycle. Accordingly, the valve element operating mechanism is operated by using the high-pressure side pressure so that the first valve element of the expansion valve can be closed.

Therefore, when the electromagnetic valve is then opened, a large amount of the refrigerant does not start to flow suddenly and it is possible to effectively suppress the refrigerant flowing noise or the like generated when the electromagnetic valve is opened. Further, since the electromagnetic valve is disposed in a range of the gas and liquid two phase refrigerant at the downstream side of the first valve element of the expansion valve, it is possible to sufficiently reduce the water hammer noise generated when the electromagnetic valve is closed, as usual.

Further, the expansion valve body may include a low-pressure refrigerant path through which the refrigerant from the outlet of the evaporator flows, and a temperature sensing rod may be disposed in the expansion valve body to pass through the low-pressure refrigerant path, for sensing a temperature of the refrigerant at the outlet of the evaporator and transmitting a pressure thereof to the first pressure chamber. Further, there may be provided first communication means in the expansion valve body, for communicating between the second valve element and the restriction path, and second communication means in the temperature sensing rod, for communicating the first communication means with the second pressure chamber. The refrigerant pressure between the second valve element and the restriction path is introduced into the second pressure chamber through the first and second communication means.

In this way, it is possible to the small-sized expansion valve in which the low-pressure refrigerant path through which the refrigerant from the outlet of the evaporator flows and the temperature sensing rod for sensing the temperature of this refrigerant are incorporated therein.

Further, a first pressure chamber may be formed at one side of the pressure responding member to receive pressure corresponding to a temperature of the refrigerant at an outlet of the evaporator, and a second pressure chamber may be formed at the other side of the pressure responding. There is provided a stopper member disposed in the second pressure chamber to form a third pressure chamber partitioned from the second pressure chamber, and the stopper member moves integrally with the pressure responding member. The refrigerant pressure between the second valve element and the restriction path is introduced into the third pressure chamber, and a refrigerant pressure at a downstream side of the second valve element is introduced into the second pressure chamber.

In this way, while the electromagnetic valve is closed, the high-pressure side pressure of the refrigeration cycle applying to the upstream side of the electromagnetic valve is applied to the stopper member so that the first valve element of the expansion valve can be closed. Accordingly, it is possible to suppress the refrigerant flowing noise or the like generated when the electromagnetic valve is opened. Further, the high-pressure side pressure of the refrigeration cycle is not applied directly to the pressure responding member when the electromagnetic valve is closed, it is not necessary for the valve element operating mechanism to be structured rigid enough against the high-pressure side pressure of the refrigeration cycle. Therefore, it is possible to manufacture the valve operating mechanism with low cost.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS

A first embodiment of the present invention will be described with reference to FIGS. 1 to 5.

Figure 1:
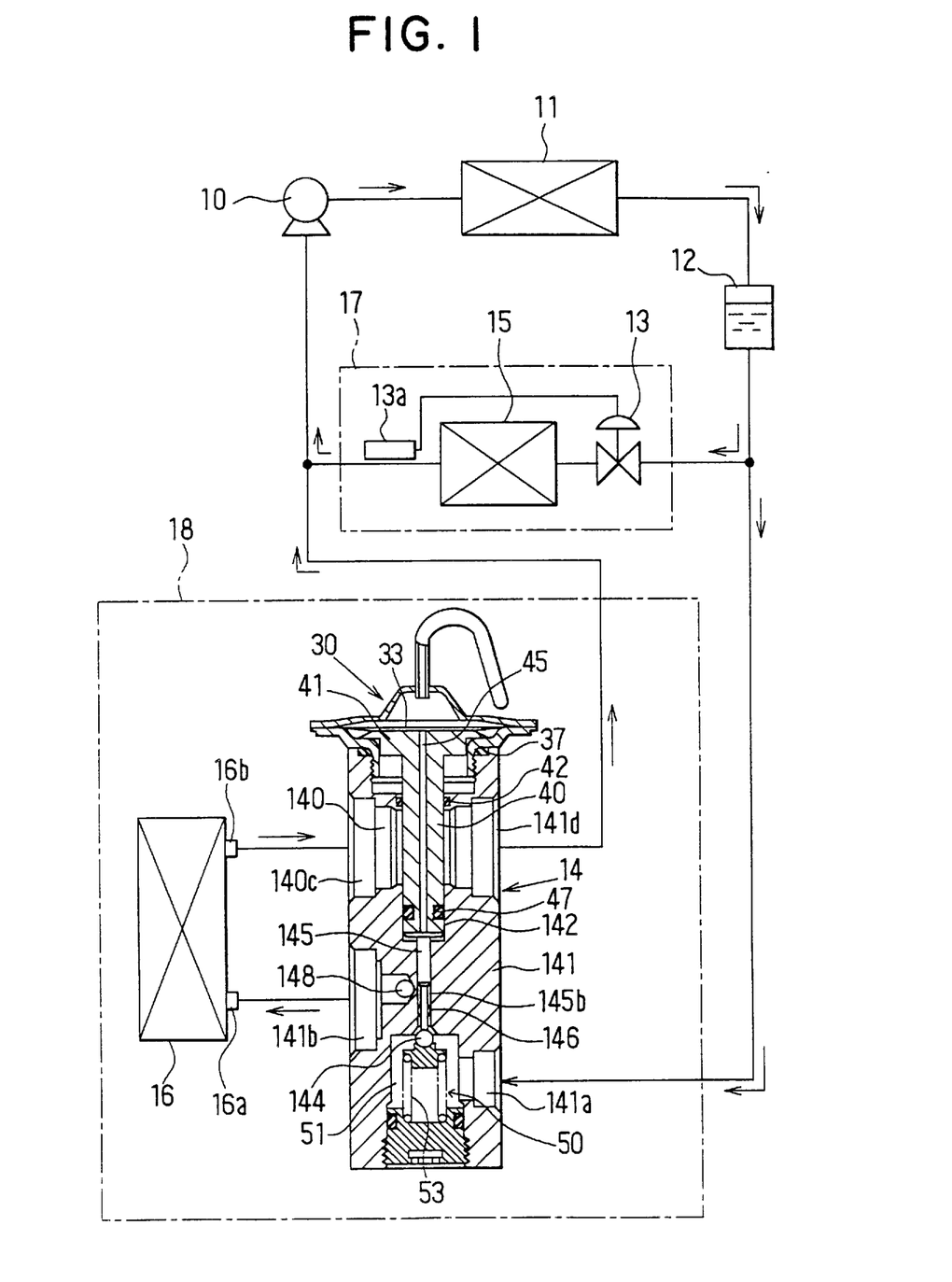
FIG. 1 shows an entire construction of a refrigeration cycle according to a first embodiment of the present invention.

FIG. 1 shows an entire construction in which an expansion valve 14 according to the present invention is employed in a refrigeration cycle. The refrigeration cycle of FIG. 1 is used for an air conditioning apparatus for a vehicle, which has air conditioning units at a front seat side and a rear seat side of the vehicle, respectively, and these air conditioning units are independently controlled.

The refrigeration cycle is provided with a compressor 10 to which an electromagnetic clutch (not shown) for intermitting a transmission of a driving force is attached. When the electromagnetic clutch is turned on to transmit a driving force from an engine of the vehicle to the compressor, the compressor is operated to compress the sucked refrigerant and discharge gas-phase refrigerant having high-temperature and high-pressure.

The condenser 11 cools and condenses the gas-phase refrigerant discharged from the compressor 10 while receiving cooling air blown by a cooling fan (not shown), and the condensed liquid-phase refrigerant flows into the receiver 12. The receiver 12 separates the condensed refrigerant therein into gas-phase refrigerant and liquid-phase refrigerant and discharges only liquid-phase refrigerant.

At the downstream side of the receiver 12, there are disposed a first and a second expansion valves 13 and 14 and a first and a second evaporators 15 and 16 in parallel with each other.

The first expansion valve 13 and the first evaporator 15 are mounted in a front air conditioning unit 17 disposed at a dashboard portion of a front portion in the passenger compartment to perform an air conditioning of a front seat side in the passenger compartment. As being known well, the first expansion valve 13 is of a thermal type in which a valve opening degree is automatically adjusted to maintain a superheating degree of the outlet-side refrigerant at a predetermined value. The first expansion valve 13 has a temperature sensing bulb 13a for sensing a temperature of the outlet-side refrigerant such that a pressure of the refrigerant therein varies.

On the other hand, the second expansion valve 14 and the second evaporator 16 are mounted in a rear air conditioning unit 18 disposed at a front portion in the passenger compartment, e.g., in a ceiling portion of a stationary wagon type car, to perform an air conditioning of a rear seat side in the passenger compartment.

Although not shown, an air conditioning blower or the like is incorporated in each of the front and rear air conditioning units 17 and 18, respectively. The refrigerant outlet-sides of the first and second evaporators 15 and 16 join together and are connected to a suction side of the compressor 10.

The second expansion valve 14 is constructed as the expansion valve integrated with the electromagnetic valve and will be described more specifically with reference to FIGS. 2 to 5. In this embodiment, the expansion valve 14 is constructed as a box-type expansion valve and integrally incorporates therein a low-pressure refrigerant path 140 through which the refrigerant from an outlet of the evaporator 16 and a temperature sensing mechanism (described later) for sensing a temperature of the refrigerant flowing through the low-pressure refrigerant path 140.

A normally-closed type electromagnetic valve 20 (see FIG. 2) is integrally assembled to the box-type expansion valve 14. The expansion valve 14 is provided with a prism-shaped valve body 141 made of a metal such as aluminum. The valve body 141 is, as shown in FIG. 1, with a refrigerant inlet 141a and a refrigerant outlet 141b at a position proximate to a lower side of an outer circumferential wall thereof. The high-pressure side liquid-phase refrigerant from the receiver 12 flows into the refrigerant inlet 141a, whereas the low-pressure refrigerant having been decompressed and expanded in a restriction path 144 (described later) flows out through the refrigerant outlet 141b. The refrigerant outlet 141b is connected to a refrigerant inlet 16a of the evaporator 16.

A low-pressure refrigerant path 140 is formed in an upstream side portion of the valve body 141 to pass through the valve body 141 in an axial direction thereof. At both end of the low-pressure refrigerant path 140, there are opened a refrigerant inlet 141c and a refrigerant outlet 141d. The refrigerant inlet 141c is connected to the outlet 16b of the evaporator 16 such that the gas-phase refrigerant evaporated in the evaporator 16 flows into the refrigerant inlet 141c.

The gas-phase refrigerant further passes through the low-pressure refrigerant path 140 and flows from the refrigerant outlet 141d out of the valve body 141. The refrigerant outlet 141d is connected to an inlet side of the compressor 10.

In a center portion of the valve body 141, a stepped inner hole 142 having a stepped portion is coaxially formed. The stepped inner hole 142 passes through the low-pressure refrigerant path 140 and extends vertically (up and down direction) in the center portion of the valve body 141. At a lower end (one end) portion of the stepped inner hole 142, there is formed a valve seat 143, and a spherical valve element 144 is vertically movably disposed to face the valve seat 143. Between the valve seat 143 and the spherical valve element 144, there is formed a restriction path 144a (see FIG. 2) for decompressing and expanding the high-pressure side liquid-phase refrigerant from the refrigerant inlet 141a.

An operation rod 145 is vertically movably fitted to a lower side portion of the stepped inner hole. A lower end portion of the operation rod 145 contacts the spherical valve element 144 to move the spherical valve element 144. A small-diameter portion is formed in a lower side portion of the operation rod 145 such that an annular refrigerant path 145b is formed between the small-diameter portion 145a and the stepped inner hole 142.

In the valve body 141, there are formed a communication hole 146 and a communication chamber 147 in a crossing direction at right angles from the stepped inner hole 142. In this way, the annular refrigerant path 145b always communicates with the communication chamber 147 through the communication hole 146. Further, there are provided a plurality of communication holes 146, and at an intermediate portion of the plurality of the communication holes 146, a cylindrical portion is projects in the communication chamber 147 such that a refrigerant path 148 is formed by the cylindrical portion.

Figure 3:
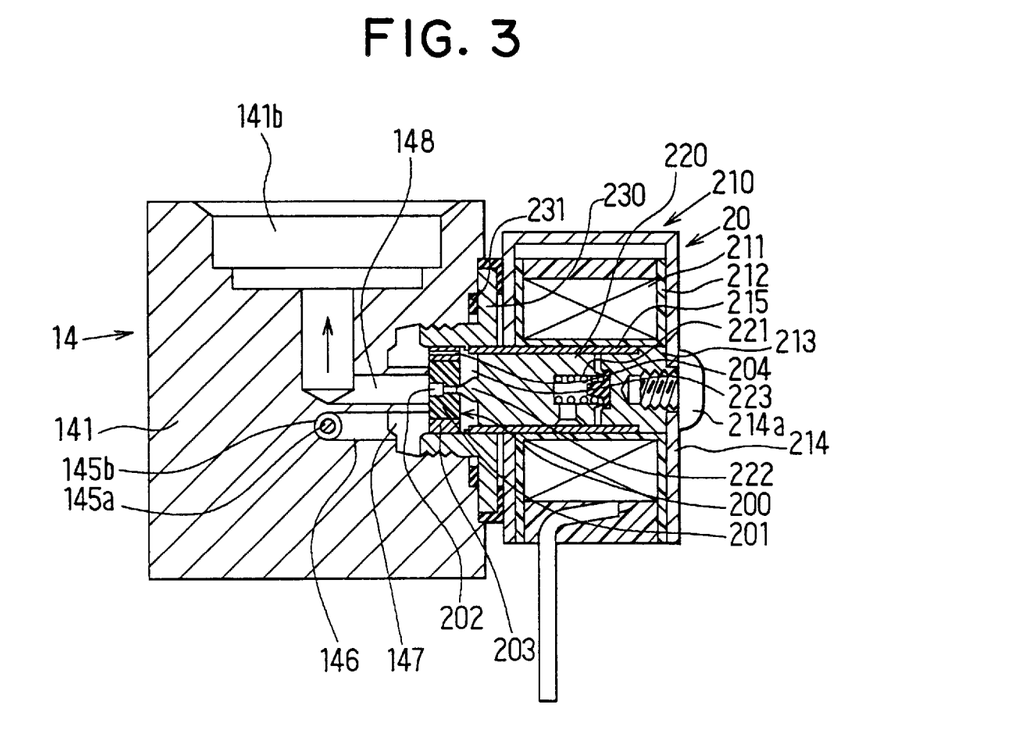
FIG. 3 is a lateral cross sectional view of the expansion valve of FIG. 2.

A valve element 200 of the normally-closed type electromagnetic valve 20 is disposed to face an end face of the refrigerant path 148 such that a communication between the communication chamber 147 and the refrigerant path 148 is intermitted by the valve element 200. As shown in FIG. 3, the refrigerant path 148 communicates with the refrigerant outlet 141b. The electromagnetic valve 20 will described more specifically later.

Next, an operating mechanism for operating the valve element 144 of the expansion valve 14 will be described. A diaphragm operating unit 30 includes an upper casing 31, a lower casing 32, and a diaphragm 33 as pressure responding member. Both of casings 31 and 32 are made of stainless type metal and fixedly holds an outer circumferential edge portion of the disc-shaped diaphragm 33 made of similar stainless type metal.

The disc-shaped diaphragm 33 is assembled to be elastically deformable in the vertical direction of FIG. 1. An inner space of both of casings 31 and 32 is partitioned by the diaphragm 33 into a temperature sensing chamber (first pressure chamber) 34 and a pressure equalizing chamber (second pressure chamber) 35. Within the temperature sensing chamber 34 at the upper side, refrigerant identical to that circulating in the refrigerant cycle is sealed under a predetermined pressure through a capillary tube 36. An annular opening portion 32a of the casing 32 at the lower side is fixedly screwed to a large-diameter portion 142a formed at one end portion (upper end portion) of the stepped inner hole 142 of the valve body 141. At the screwed fixing portion, air-tightness is maintained by a rubber O-ring (elastic sealing member) 37.

Figure 2:
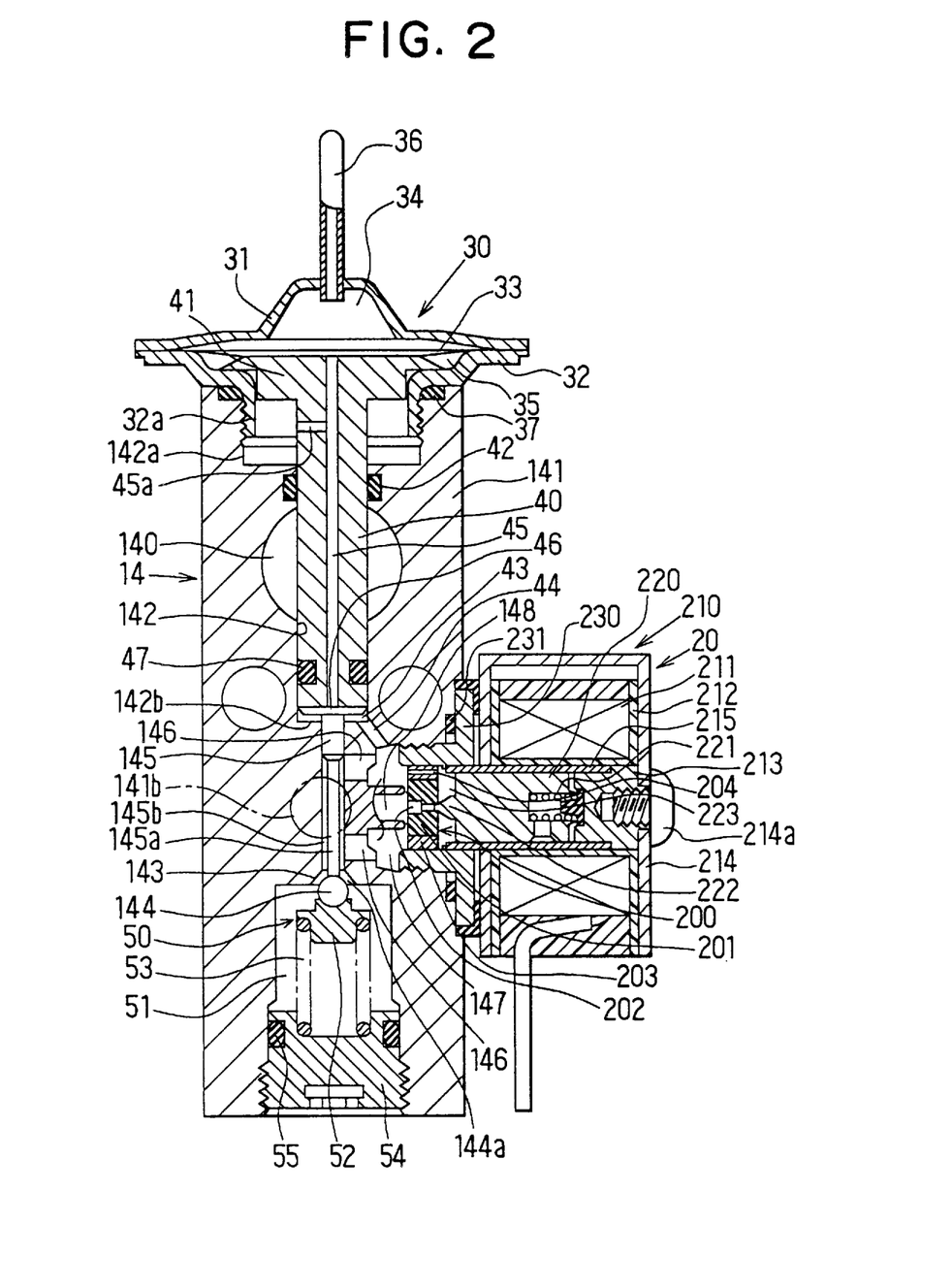
FIG. 2 is an elevational cross sectional view of an expansion valve integrated with an electromagnetic valve in the first embodiment.

The temperature sensing rod 40 is made of a metal which is superior in a thermal conductivity, such as aluminum, and is formed into a columnar shape. For sensing a temperature of the refrigerant at the outlet of the evaporator, the temperature sensing rod 40 is disposed, as shown in FIGS. 1 and 2, to pass through the low-pressure refrigerant path 140 through which the gas-phase refrigerant from the outlet of the evaporator passes.

One end portion (upper end portion) of the temperature sensing rod 40 is constructed as a large-diameter portion 41. The large-diameter portion 41 is disposed in the pressure equalizing chamber 35 such that the large-diameter portion 41 may contact one side face (lower side face) of the disc-shaped diaphragm 33. A variation in the temperature of the temperature sensing rod 40 is transmitted to the refrigerant in the temperature sensing chamber 34 through the diaphragm 33 made of metallic thin plate. The refrigerant pressure in the temperature sensing chamber 34 becomes a pressure corresponding to the temperature of the refrigerant flowing from the outlet of the evaporator through the low-pressure refrigerant path 140.

The temperature sensing rod 40 is axially slidably disposed in the stepped inner hole 142 of the valve body 141. A movement of the diaphragm 33 is transmitted to the valve element 144 through the operation rod 145. The other end portion (the lower end portion) of the temperature sensing rod 40 contacts one end portion (an upper end portion) of the operation rod 145.

In the axial direction of the stepped inner hole 142, there is disposed a rubber O-ring (elastic sealing member) 42 in a portion between the low-pressure refrigerant path 140 and the pressure equalizing chamber 35 to maintain air-tightness therebetween.

Further, to the pressure equalizing chamber 35, the refrigerant pressure between the valve element 200 of the electromagnetic valve 20 and the restriction path 144a is introduced through a pressure introduction path (described below). That is, as shown in FIG. 2, a pressure chamber 43 is formed between the lower end portion of the temperature sensing rod 40 and an intermediate stepped face 142b of the stepped inner hole 142, and the pressure chamber 43 is communicated with the communication chamber 147 through the communication hole 44 provided in the valve body 141.

Figure 4:
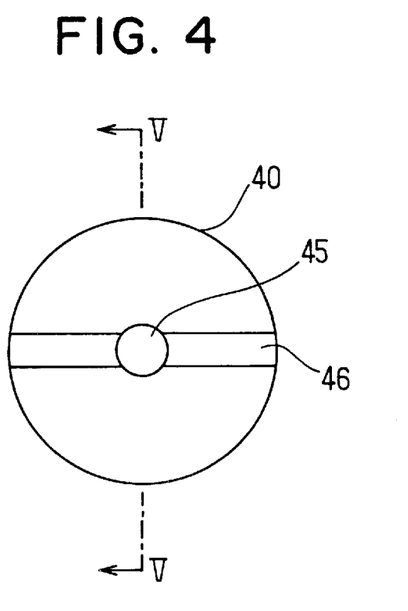
FIG. 4 is a bottom view of a temperature sensing rod of FIG. 2.
Figure 5:
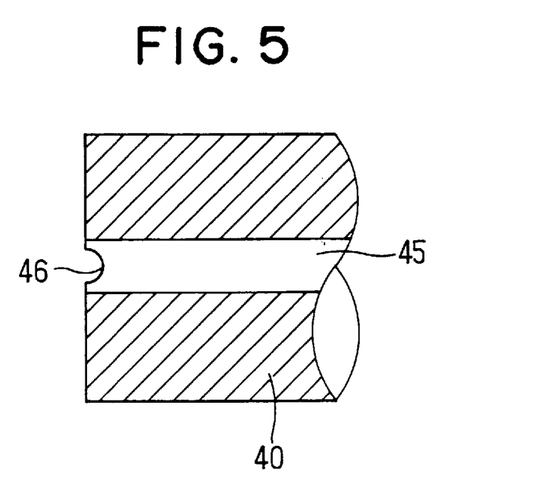
FIG. 5 is a cross sectional view taken along line V—V of FIG. 4.

A communication hole 45 is formed to pass through a center portion of the temperature sensing rod in the axial direction thereof, and as shown in FIGS. 4 and 5, a groove portion 46 having a U-shaped cross section is provided at the lower end portion of the temperature sensing rod 40. Therefore, even when the lower end portion of the temperature sensing rod 40 contacts the upper end portion of the operation rod 145, the pressure chamber 43 is always communicated with the communication hole 45 through the groove portion 46. Through the above-described pressure introduction path composed of the communication hole 44, the pressure chamber 43, the groove portion 46, and the communication hole 45 in this order, the refrigerant pressure (i.e., the pressure in the communication chamber 147) between the valve element 200 of the electromagnetic valve 20 and the restriction path 144a is introduced into the pressure equalizing chamber 35.

To the communication hole 45, there is connected an auxiliary communication hole 45a extending radially from the center portion of the temperature sensing rod 40. Also, through the auxiliary communication hole 45a, the above-described refrigerant pressure is introduced. Each of the communication holes 44, 45 and 45a may have a diameter of approximately 1.0 mm, for example. Further, the groove portion having the U-shaped cross section has a depth of approximately 0.5 mm, for example.

In the axial direction of the stepped inner hole 142, there is disposed a rubber O-ring (elastic sealing member) 47 in a portion between the low-pressure refrigerant path 140 and the pressure chamber 43 to maintain air-tightness therebetween.

Next, a spring mechanism 50 for applying a predetermined spring force to the valve element 144 of the expansion valve 14 will be described. In the valve body 141, at the lower side of the stepped inner hole 142, there is formed an accommodating chamber 51 of the spring mechanism 50. The accommodating chamber 51 communicates with the refrigerant inlet 141a into which the high-pressure refrigerant flows. On the upper end portion in the accommodating chamber 51, there is disposed a metallic support plate 52 joined by welding to the valve element 144 made of stainless.

One end of a coil spring 53 (spring means) contacts and supports the support plate 52. The other end of the coil spring 53 is supported by a metallic plug 54. The plug 54 functions as a cover member for closing an opening end of the accommodating chamber 51 toward the outside and is detachably fixed to the valve body 141 by screws. A fixed position of the plug by screws is adjusted so that a preset load of the coil spring 53 is adjusted. In this way, a spring force applied to the valve element 144 is adjusted.

A superheating degree at the outlet of the evaporator, which is set by the expansion valve 14, can be adjusted by adjusting the above-described spring force.

At the top end portion of the plug 54, there is disposed a rubber O-ring (elastic sealing member) 55 to maintain air-tightness between the accommodating chamber 51 and the outside.

The normally-closed type electromagnetic valve 20 is a pilot type electromagnetic valve including a valve element 200, a electromagnet 210, and a columnar plunger 220 made of magnetic material. The valve member 200 has a substantially disc-shape. A minute valve hole 202 is formed at the center portion of the valve member 200. The valve hole 202 is formed in a resin member 201. The resin member 201 is preferably formed with resin material (e.g., fluorine type resin) which can be satisfactorily molded with high accuracy in size and can sufficiently maintain a sealing performance with an end face of the refrigerant.

On the outer circumferential portion of the resin member 201, there is disposed a piston member 203 made of metal such as brass. Both are connected integrally to each other by caulking or the like. The piston member 203 is disposed slidably in the left-right direction of FIG. 2 in an inner circumferential portion of a mounting screw member 230 made of non-magnetic metal.

The mounting screw member 230 is for detachably fixing the normally-closed type electromagnetic valve 20 on the valve body 141. The mounting screw member 230 is cylindrical and made of non-magnetic metal. At the screw fixing portion of the mounting screw member 230, there is disposed a rubber O-ring (elastic sealing member) 231 to maintain air-tightness between the communication chamber 147 and the outside.

The electromagnet 210 is provided with a resin bobbin winding a solenoid 211 therearound. In a hollow top end portion of the bobbin 212, a columnar magnetic pole member 213 is coaxially fitted. The magnetic pole member 213 is fastened in a magnetic frame body 214 made of magnetic material by a screw 214.

Further, in a hollow portion of the bobbin 212, a cylindrical support member 215 made of non-magnetic material is coaxially and fixedly fitted. One end of the support member 215 is fixedly fitted in an inner circumferential portion of the mounting screw member 230. In this way, the mounting screw member 230 and the electromagnet 210 portion are integrally connected with the support member 215.

The plunger 220 is cylindrical and made of magnetic material. The plunger 220 is fitted in an axial direction in a hollow portion of the support member 215. The plunger 220 has a valve portion 222 projecting conically from an end face at the side of the valve element 200. The plunger 220 is biased by the coil spring 221 in the left direction of the drawing, i.e., toward the valve element 200, such that the valve portion 222 is seated on the valve hole 202 portion of the valve element 200 to close the valve hole 202.

Between the end face at the side of valve portion 222, of the plunger 220 and the valve element 200, there is formed a back pressure chamber 223. Further, in the valve element 200, there is formed a minute hole 204 for always communicating between the back pressure chamber 223 and the communication chamber 147.

In the normally-closed type electromagnetic valve 20 as constructed above, when electric current is supplied to the solenoid 211 to generate a magnetic flux, the plunger 220 is attracted by the magnetic pole 213 while resisting the coil spring 221, and the valve portion 222 is separated from the valve hole 202 so that the valve hole 202 is opened. Then, the back pressure chamber 223 communicates with the refrigerant outlet 141b through the refrigerant path 148, and the pressure of the back pressure chamber 223 drops down to the pressure at the refrigerant outlet 141b (i.e., the low-pressure of the evaporator 16).

On the other hand, the pressure of the communication chamber 147 is maintained at the high-pressure side pressure of the refrigeration cycle, because the communication between the communication chamber 147 and the refrigerant path 148 is interrupted so far. Therefore, the pressure of the communication chamber 147 is higher than that of the back pressure chamber 223, and the valve element 200 is moved in the right direction in FIGS. 2 and 3 by a pressure difference between both chambers 147 and 223, so that the refrigerant path 148 is opened. That is, the normally-closed type electromagnetic valve 20 moves the plunger 220 in the right direction in the drawing when electric current is supplied to the solenoid 211, to generate a pressure difference between both chambers 147 and 223. In this way, the valve element 220 is opened.

In contrast, when electric current to be supplied to the solenoid coil 211 is stopped, the plunger 220 is moved in the left direction in FIGS. 2 and 3 by the spring force of the coil spring 221, and the valve portion 222 is seated on the valve hole 202 portion of the valve element 200 so that the valve hole 202 is closed. That is, the refrigerant in the communication chamber 147 is introduced through the minute hole 204 into the back pressure chamber 223 which has been maintained at the low-pressure side pressure. Therefore, the valve portion 222 of the plunger 220 is seated on the valve hole 202 to close the valve hole 202, and the valve element 200 is moved in the left direction in FIGS. 2 and 3 and is seated on the end face of the refrigerant path 148 to close the refrigerant path 148. In this way, the normally-closed type electromagnetic valve 20 is recovered to be closed.

Next, an operation of the embodiment having the above-described construction will be described.

In FIG. 1, when a driving force from the engine of the vehicle is transmitted to the compressor 10 through the electromagnetic clutch to start the compressor 10, the compressor 10 sucks and compresses the refrigerant in the path at the downstream sides of the evaporators 15 and 16, and discharges gas-phase refrigerant having a high-temperature and a high-pressure toward the condenser 11. Then, the condenser 11 cools and condenses the gas-phase refrigerant.

The condensed refrigerant flows into the receiver 12, and the gas-phase refrigerant and the liquid-phase refrigerant are separated therein. The liquid-phase refrigerant flows out of the receiver 12 and flows toward the first and second expansion valves 13 and 14 disposed in parallel.

When there is no passenger at the rear seat side, it is not necessary to perform an air conditioning of the rear seat side, and therefore, the rear air conditioning unit 18 is not operated. Accordingly, the electric current to be supplied to the solenoid 211 of the electromagnetic valve 20 is interrupted, the valve element 200 is closed to close the refrigerant path 148. In this way, the inlet-side refrigerant path of the second evaporator 16 is closed so that the refrigerant does not circulate into the second evaporator 16.

On the other hand, in the front air conditioning unit 17, the liquid-phase refrigerant from the receiver 12 is decompressed and expanded in the first expansion valve 13 and becomes gas and liquid two phase refrigerant. The gas and liquid two phase refrigerant is evaporated while absorbing heat from conditioned air in the first evaporator 15. In this way, so that the conditioned air is cooled and blown into the front seat side in the passenger compartment to perform the air conditioning.

As being known well, the opening degree of the expansion valve 13 is automatically adjusted according to a temperature of the refrigerant at the outlet of the evaporator, sensed by the temperature sensing bulb 13a, to maintain the superheating degree of the refrigerant at the outlet of the evaporator at a predetermined value.

The second expansion valve 14 provided in the rear air conditioning unit 18 is integrated with the electromagnetic valve 20. When the electromagnetic valve 20 is closed, the refrigerant does not circulate in the second evaporator 16, and therefore, the temperature of the refrigerant in the low-pressure refrigerant path 140 formed in the valve body 141 of the expansion valve 14 increases up to approximately a temperature of the passenger compartment. Accordingly, the temperature of the temperature sensing chamber 34 also corresponds to the temperature of the passenger compartment.

However, in this embodiment, the refrigerant pressure in the communication chamber 147 between the valve element 200 of the electromagnetic valve 20 and the restriction path 144a is introduced into the pressure equalizing chamber 35 through the pressure introduction path composed of the communication hole 44, the pressure chamber 43, the groove portion 46, and the communication holes 45 and 45a in this order. When the electromagnetic valve 20 is closed, the communication chamber 147 is communicated with the high-pressure side of the refrigeration cycle through the restriction path 144a to become the high-pressure side pressure.

When the electromagnetic valve 20 is closed, the high-pressure side pressure of the refrigeration cycle is applied to the pressure equalizing chamber 35, and the high-pressure side pressure is sufficiently higher than a refrigerant saturated pressure at the temperature of the passenger compartment. Therefore, even if the temperature of the temperature sensing chamber 34 increases up to approximately the temperature of the passenger compartment, the pressure in the pressure equalizing chamber 35 is sufficiently higher than that in the temperature sensing chamber 34. As a result, the diaphragm 33 of the diaphragm operating unit 30 deforms upwardly so that the valve element 144, the operation rod 145, and the temperature sensing rod 40 are moved upwardly by the spring force of the coil spring 53. Accordingly, the valve element 144 is seated on the valve seat face 143 to be closed.

Here, since both of the valve element 144 and the valve seat face 143 are made of metal, the valve element 144 is not strictly closed so that the high-pressure side pressure in the accommodating chamber 51 leaks through the minute clearance between the valve element 144 and the valve seat face 143 toward the communication chamber 147.

Next, while the valve element 144 of the expansion valve 14 is closed, when electric current is supplied to the solenoid 211 of the electromagnetic valve 20 to operate the rear air conditioning unit 18, the valve element 200 of the electromagnetic valve 20 is opened so that the cylindrical refrigerant path 148 is opened. However, at this time, since the valve element 144 of the expansion valve 144 is closed, a large amount of refrigerant does not start to flow suddenly after the electromagnetic valve 20 is opened.

That is, after the electromagnetic valve 20 is opened, the pressure in the pressure equalizing chamber 35 gradually lowers through the above-described pressure introduction path down to the low-pressure side pressure. Therefore, the opening degree of the valve element 144 of the expansion valve 14 also gradually increases with the result that the amount of the refrigerant flowing through the expansion valve 14 gradually increases. In this way, it is possible to effectively suppress the noise due to the variation in the pressure before and after the valve element 144 of the expansion valve 14 as well as the flowing noise due to the large amount of the rapid flow of the refrigerant.

When a predetermined time has elapsed since the electromagnetic valve 20 is opened, the pressure in the pressure equalizing chamber 35 of the diaphragm operating unit 30 becomes a pressure of the refrigerant at the inlet side of the evaporator 16 (the low pressure at the inlet side of the evaporator). Hereafter, the valve element 144 of the expansion valve 14 is moved to a position according to a balance of the spring force of the coil spring 53 of the spring mechanism 50 and the pressure difference between and the low pressure at the inlet side of the evaporator, which is applied to the pressure equalizing chamber 35, and the refrigerant pressure in the temperature sensing chamber 34, which corresponds to the temperature of the refrigerant at the outlet side of the evaporator.

In this way, the valve element 144 of the expansion valve 14 adjusts the opening degree of the restriction path 144a for adjusting the flow amount of the such that the refrigerant at the outlet side of the evaporator can maintain a predetermined superheating degree. That is, the expansion valve 14 adjusts the flow amount of the refrigerant as the internal equalizing type expansion valve.

As being understood from the above-described operation, when the electromagnetic valve 20 is closed, the high-pressure side pressure of the refrigeration cycle is applied to the pressure equalizing chamber 35 of the diaphragm operating unit 30. Therefore, when the diaphragm operating unit 30 is specifically designed, the diaphragm 33 may be made of stainless type material which is superior in the fatigue resistant characteristics, or the casings 31 and 32 may be formed in a shape having a thick wall.

A second embodiment of the present invention will be described with reference to FIG. 6.

Figure 6:
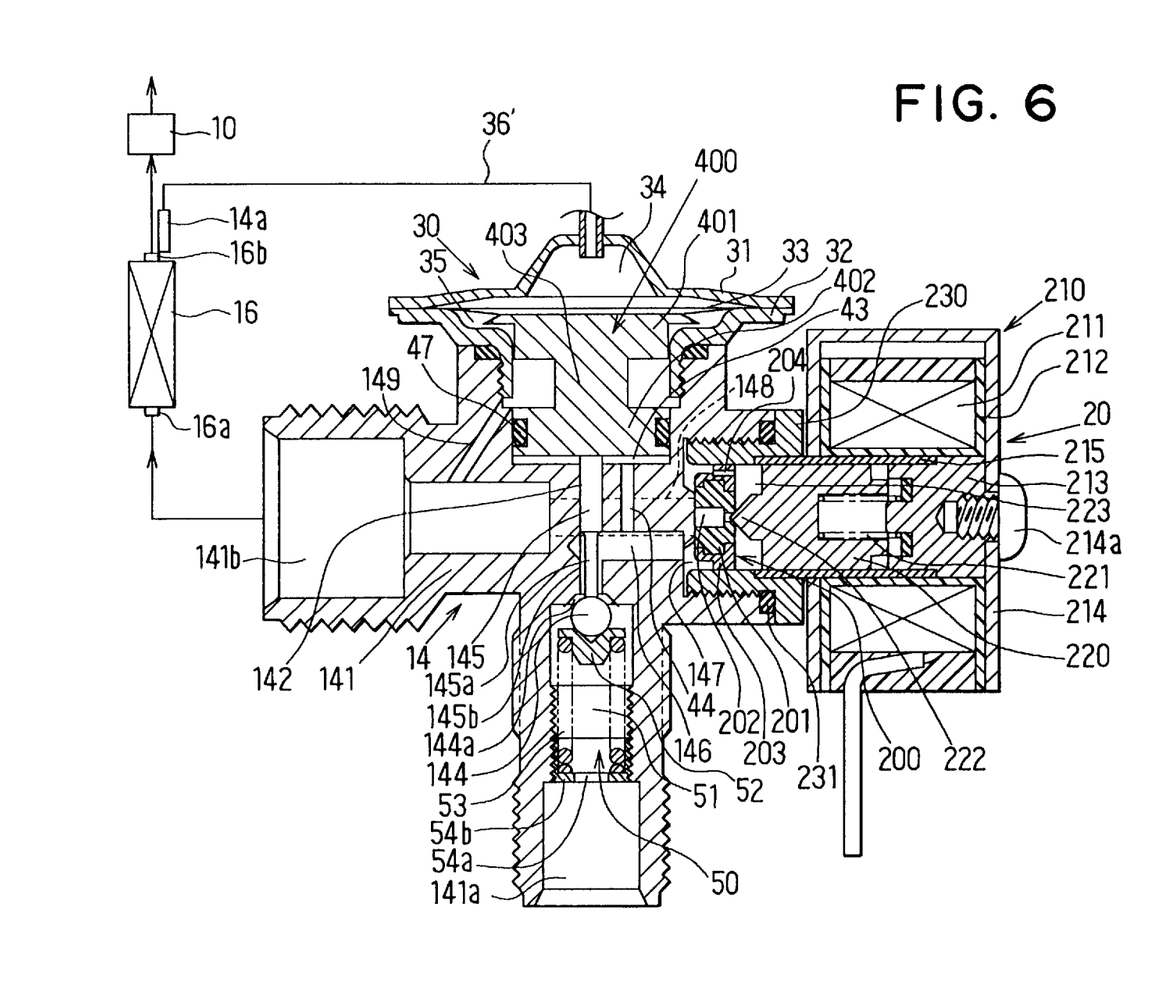
FIG. 6 is an elevational cross sectional view of an expansion valve integrated with an electromagnetic valve according to a second embodiment of the present invention.

In FIG. 6, the temperature sensing rod 40 is omitted, and instead, there is provided a temperature sensing bulb 14a corresponding to the temperature sensing bulb 13a in FIG. 1 at the refrigerant outlet portion of the evaporator 16. The temperature sensing bulb 14a is connected to the temperature sensing chamber 34 through the capillary tube 36'.

Accompanied by the omission of the temperature sensing rod 40, a stopper member 400 for transmitting movement is interposed between the operation rod 145 and the diaphragm 33. the stopper member 400 has large-diameter portions 401 and 402 at both ends in the axial direction and a small-diameter portion 403 therebetween. A rubber O-ring (elastic sealing member) is disposed around an outer circumferential surface of the lower side large-diameter portion 402 to partition air-tightly between the pressure chamber 402 below the large-diameter portion 402 and the pressure equalizing chamber 35.

An annular refrigerant path 145a formed around the small-diameter portion 145a of the operation rod 145 communicates at the downstream side of the valve element 144 of the expansion valve 14 with the communication chamber 147 through the communication hole 146. In the same manner as in the first embodiment, the communication between the communication chamber 147 and the refrigerant outlet 141b is opened or closed by the valve element 200 of the electromagnetic valve 20.

The accommodating chamber 51 for accommodating the spring mechanism 50 is formed directly at the downstream side of the refrigerant outlet 141a. Accordingly, in the second embodiment, instead of the plug 54, a support plate 54b, in which the refrigerant flow hole 54a is opened, is fixed to the valve body 141 with screws.

There is formed a communication hole 44 for communicating the communication hole 146 formed between the valve element 144 of the expansion valve 14 and the valve element 200 of the electromagnetic valve 20 with the pressure chamber 43 below the large-diameter portion 402 of the stopper member 400.

In this way, also in the second embodiment, when the electromagnetic valve 20 is closed, the high-pressure side pressure of the refrigeration cycle is applied to the pressure chamber 43 from the communication hole 146 disposed at the upstream side of the valve element 200 of the electromagnetic valve 20 through the communication hole 44. As a result, the stopper member 400 is pushed upwardly, and the valve element 144 of the expansion valve 14 is closed.

In this case, since the high-pressure side pressure of the refrigeration cycle is applied to the large-diameter portion 402 of the stopper member 400, the area receiving the pressure is increased as compared with the temperature sensing rod 40 in the first embodiment, so that the force for pushing the stopper member 400 upwardly can be increased.

Further, in the valve body 141, there is formed a communication hole 149 for communicating the refrigerant outlet 141b with the pressure equalizing chamber 35. More specifically, the communication hole 149 is opened at the outer circumference side of the small-diameter portion 403 located above the O-ring 47. In this way, the refrigerant pressure at the inlet side of the evaporator 16 is introduced into the pressure equalizing chamber 35 from the refrigerant outlet 141b through the communication hole 149.

Accordingly, when the electromagnetic valve 20 is opened, the valve element 144 of the expansion valve 14 is moved according to the refrigerant pressure in the temperature sensing chamber 34, which corresponds to the temperature of the refrigerant at the outlet side of the evaporator, detected by the temperature sensing bulb 14a, and the refrigerant pressure at the inlet side of the evaporator, which is introduced into the pressure equalizing chamber 35 through the communication hole 149. In this way, the opening degree (the flow amount of the refrigerant) of the restriction path 144a is adjusted.

As being understood from the above-described operation, in the second embodiment, the pressure equalizing chamber 35 and the pressure chamber 43 are partitioned by the O-ring 47, and the high-pressure side pressure of the refrigeration cycle is not applied directly to the pressure equalizing chamber 35 when the electromagnetic valve 20 is closed. Therefore, when the diaphragm operating unit 30 is specifically designed, the diaphragm 33 or the casings 31 and 32 may have compressive strength as usual.

Figure 7:
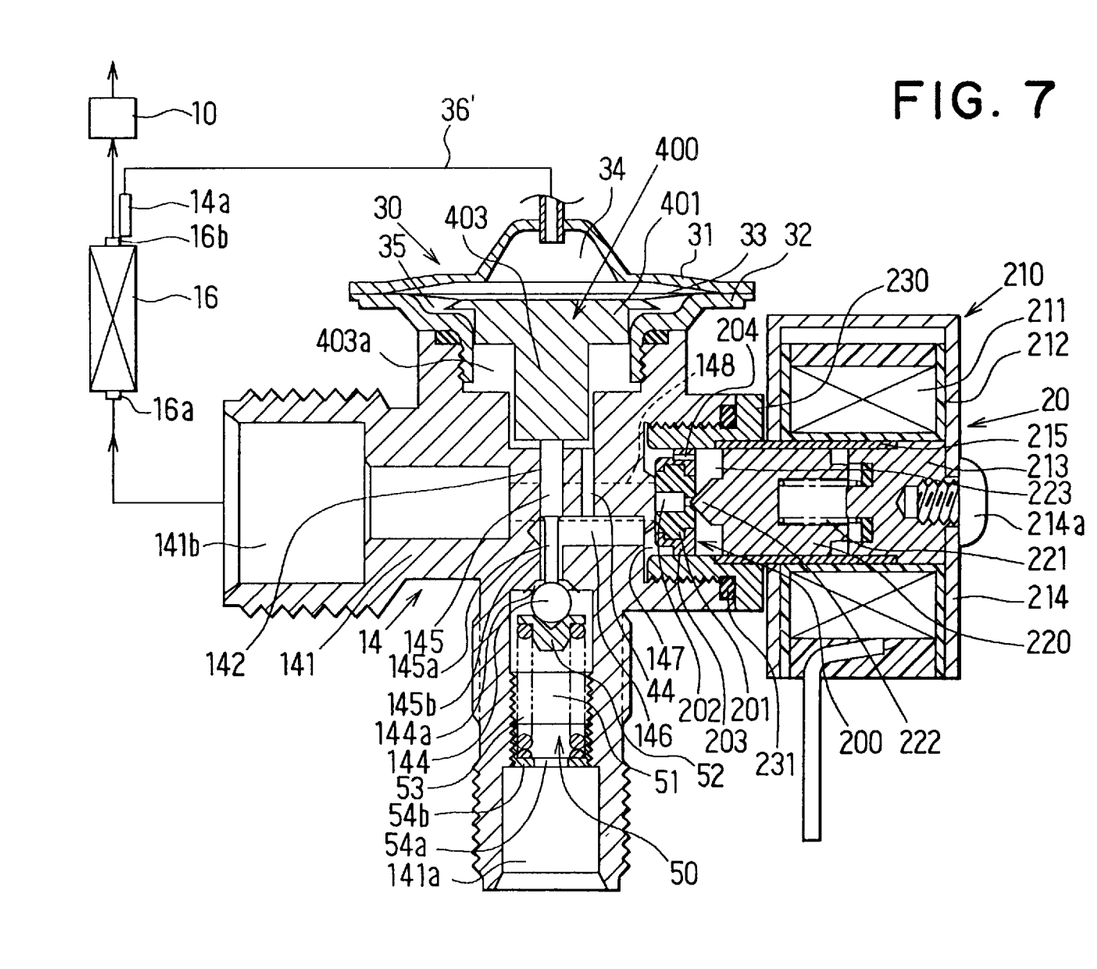
FIG. 7 is an elevational cross sectional view of an expansion valve integrated with an electromagnetic valve according to a third embodiment of the present invention.

A third embodiment of the present invention will be described with reference to FIG. 7.

In the third embodiment, the communication hole 149 of the valve body 141, the large-diameter portion 402 of the stopper member 400, and the O-ring 47 on the outer circumferential surface of the large-diameter portion 402 are omitted, and instead the small-diameter portion 403 of the stopper member 400 is extended up to the lower end portion. Further, a clearance portion 403a around the inner-diameter portion 403 is communicated with the communication hole 44. In this way, the pressure equalizing chamber 35 below the diaphragm 33 is communicated with the communication hole 146 and the communication chamber 147 disposed at the upstream side of the valve element 200 of the electromagnetic valve 20 through the above-described clearance 403a and the communication hole 44.

In the third embodiment, in the same manner as in the first embodiment, the refrigerant pressure at the upstream side of the valve element 200 of the electromagnetic 20 is applied to the pressure equalizing chamber 35 below the diaphragm 33.

Figure 8:
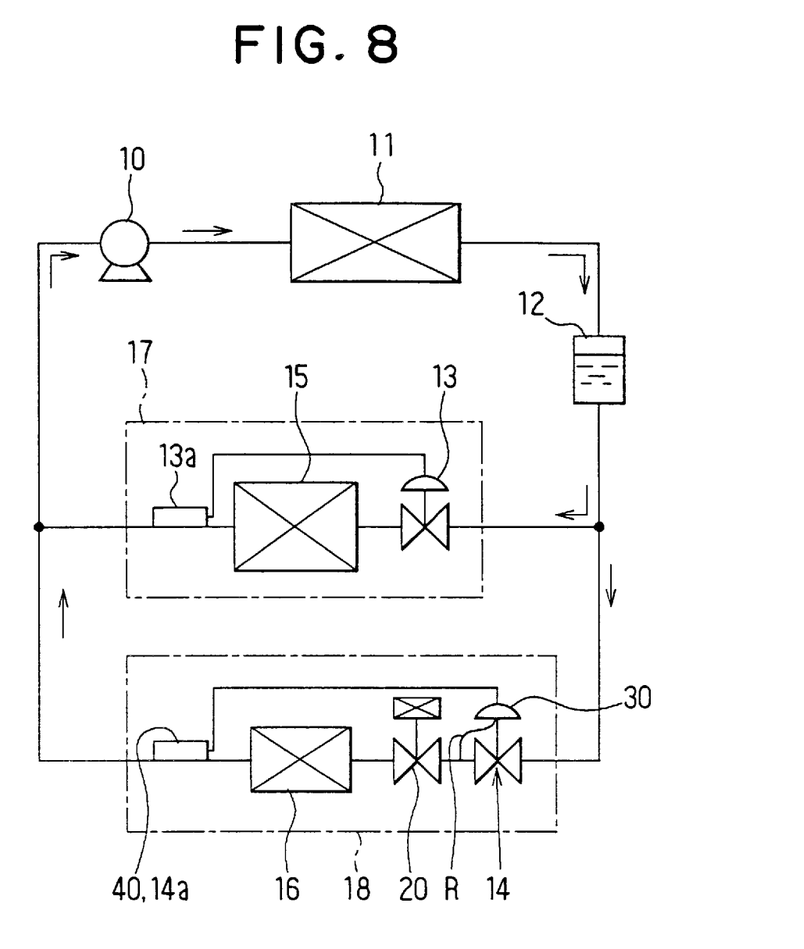
FIG. 8 shows a refrigeration cycle employing the elevational cross sectional view of the expansion valve integrated with an electromagnetic valve according to the first embodiment or the third embodiment of the present invention.

That is, in the refrigeration cycle employing the expansion valve 14 integrated with the electromagnetic valve as shown in FIG. 8, there is provided a pressure introduction path R for applying the refrigerant pressure between the downstream side of the restriction path 144a of the expansion valve 14 and the upstream side of the valve element 200 of the electromagnetic valve 20 into the pressure equalizing chamber 35 below the diaphragm 33 in the diaphragm operating unit 30.

In the first embodiment, the pressure introduction path R is constructed by a path composed of the communication hole 44, the pressure chamber 43, the groove portion 46, and the communication hole 45 and 45a in this order. Further, in the third embodiment, the pressure introduction path R is constructed by the communication hole 44 and the clearance portion 403a.

The present invention is not limited to the refrigeration cycle for a vehicle, but may be widely employed in refrigeration cycle for an air conditioning apparatus, a freezing apparatus, a refrigerating apparatus, or the like, installed in a general construction building.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined in the appended claims.

What is claimed is:

1. An expansion valve integrated with an electromagnetic valve employed in a refrigeration cycle having evaporators connected in parallel, said expansion valve decompressing and expanding refrigerant, said electromagnetic valve opening and closing a refrigeration path of the refrigeration cycle, said expansion valve integrated with said electromagnetic valve comprising:

an expansion valve body for forming an outer shape of said expansion valve, said expansion body having an inlet refrigerant path for introducing high-pressure side refrigerant of the refrigeration cycle, a restriction path for decompressing and expanding the refrigerant introduced from said inlet refrigerant path and an outlet refrigerant path for supplying the refrigerant decompressed and expanded in said restriction path;

a first valve element for adjusting an opening degree of said restriction path; and a valve element operating mechanism for moving said first valve element; wherein, said electromagnetic valve is integrally assembled in said expansion valve body and includes a second valve element disposed to open and close said outlet refrigerant path, and when said second valve element is closed, said valve element operating mechanism operates based on a refrigerant pressure between said second valve element and said restriction path such that said first valve element is closed.

2. An expansion valve integrated with an electromagnetic valve according to claim 1, wherein, said valve element operating mechanism includes a pressure responding member for moving said first valve element, said pressure responding member receiving the refrigerant pressure between said second valve element and said restriction path, and when said second valve element is closed, said pressure responding member is moved by the refrigerant pressure between said second valve element and said restriction path to close said first valve element.

3. An expansion valve integrated with an electromagnetic valve according to claim 2, further comprising:

means for forming a first pressure chamber at one side of said pressure responding member, said first pressure chamber receiving a pressure corresponding to a temperature of the refrigerant at an outlet of said evaporator; and means for forming a second pressure chamber at the other side of said pressure responding member, said second pressure chamber receiving the refrigerant pressure between said second valve element and said restriction path.

4. An expansion valve integrated with an electromagnetic valve according to claim 3, wherein said expansion valve body includes a low-pressure refrigerant path through which the refrigerant from said outlet of said evaporator flows.

5. An expansion valve integrated with an electromagnetic valve according to claim 4, further comprising:

a temperature sensing rod disposed in said expansion valve body to pass through said low-pressure refrigerant path, for sensing a temperature of the refrigerant at the outlet of said evaporator and transmitting a pressure thereof to said first pressure chamber;

first communication means disposed in said expansion valve body, for communicating between said second valve element and said restriction path; and second communication means disposed in said temperature sensing rod, for communicating said first communication means with said second pressure chamber;

wherein the refrigerant pressure between said second valve element and said restriction path is introduced into said second pressure chamber through said first and second communication means.

6. An expansion valve integrated with an electromagnetic valve according to claim 1, wherein said valve element operating mechanism includes a pressure responding member for moving said first valve element, said expansion valve integrated with said electromagnetic valve further comprising:

means for forming a first pressure chamber at one side of said pressure responding member, said first pressure chamber receiving a pressure corresponding to a temperature of the refrigerant at an outlet of said evaporator;

means for forming a second pressure chamber at the other side of said pressure responding member;

a stopper member disposed in said second pressure chamber to form a third pressure chamber partitioned from said second pressure chamber, said stopper member moving integrally with said pressure responding member, the refrigerant pressure between said second valve element and said restriction path being introduced into said third pressure chamber;

wherein a refrigerant pressure at a downstream side of said second valve element is introduced into said second pressure chamber.

7. A refrigeration cycle comprising:

a compressor for compressing and discharging refrigerant;

a condenser for cooling and condensing the refrigerant discharged from said compressor;

a first expansion valve for decompressing and expanding the liquid-phase refrigerant condensed in said condenser;

a second expansion valve disposed in parallel with said first expansion valve, for decompressing and expanding the liquid-phase refrigerant condensed in said condenser;

a first evaporator for evaporating the refrigerant decompressed and expanded in said first expansion valve;

a second evaporator disposed in parallel with said first evaporator, for evaporating the refrigerant decompressed and expanded in said first expansion valve; wherein,    at least one of said first expansion valve and said second expansion valve is constructed as an expansion valve integrated with an electromagnetic valve, said electromagnetic valve opening and closing a refrigeration path of the refrigeration cycle, said expansion valve integrated with said electromagnetic valve comprising:

an expansion valve body for forming an outer shape of said expansion valve, said expansion body having an inlet refrigerant path for introducing high-pressure side refrigerant of the refrigeration cycle, a restriction path for decompressing and expanding the refrigerant introduced from said inlet refrigerant path and an outlet refrigerant path for supplying the refrigerant decompressed and expanded in said restriction path;

a first valve element for adjusting an opening degree of said restriction path; and    a valve element operating mechanism for moving said first valve element;

said electromagnetic valve is integrally assembled in said expansion valve body and includes a second valve element disposed to open and close said outlet refrigerant path, and when said second valve element is closed, said valve element operating mechanism operates based on a refrigerant pressure between said second valve element and said restriction path such that said first valve element is closed.

8. A refrigeration cycle according to claim 7, wherein, when said second valve element is closed, said valve element operating mechanism receives a refrigerant pressure between said second valve element and said restriction path and a pressure corresponding to a temperature of the refrigerant at the outlet of said evaporator such that said valve element operating mechanism moves said valve element based on both of said pressures.

\* \* \* \* \*

UNITED STATES PATENT AND TRADEMARK OFFICE
CERTIFICATE OF CORRECTION

PATENT NO. : 5,826,438
DATED : October 27, 1998
INVENTOR(S) : Shigeji Ohishi et al It is certified that error appears in the above-identified patent and that said Letters Patent is hereby corrected as shown below:

Title Page, [57] Abstract, line 12, delete "valve 200" & substitute --valve 20-- therefor Title Page, [57] Abstract, line 15, after "electromagnetic" insert --valve--

Col. 3, line 13, after "responding" insert --member--

Col. 5, line 15, delete "end" & substitute --ends--

Col. 5, line 54, delete "is"

Col. 6, line 22, delete "a"

Col. 7, line 40, after "stainless" insert --type metal--

Col. 8, line 21, delete "screw 214" & substitute --screw 214a-- therefor

Col. 9, line 51, delete "so that"

Col. 10, line 45, delete "valve 144" & substitute --valve 14-- therefor

Col. 11, line 1, delete 2nd occurrence of "and"

UNITED STATES PATENT AND TRADEMARK OFFICE
CERTIFICATE OF CORRECTION

PATENT NO. : 5,826,438
DATED : October 27, 1998
INVENTOR(S) : Shigeji Ohishi et al It is certified that error appears in the above-identified patent and that said Letters Patent is hereby corrected as shown below:

Col. 11, line 9, after 2nd occurrence of "the" insert --refrigerant--

Col. 11, line 34, delete "the" & substitute --The-- therefor

Col. 11, line 43, delete "portion 145a" & substitute --portion 403-- therefor

Col. 12, line 59, after "electromagnetic" insert --valve--

Signed and Sealed this

Twenty-fifth Day of April, 2000

Attest:

Q. TODD DICKINSON

*Attesting Officer*      *Director of Patents and Trademarks*